United States Patent [19]

Grube et al.

[11] Patent Number: 5,689,809
[45] Date of Patent: Nov. 18, 1997

[54] METHOD FOR DETERMINING GEOGRAPHIC RELATIONSHIPS BETWEEN COMMUNICATION UNITS

[75] Inventors: Gary W. Grube, Palatine; Marc C. Naddell, Schaumburg; Mark L. Shaughnessy, Algonquin, all of Ill.

[73] Assignee: Motorola, Inc., Schaumburg, Ill.

[21] Appl. No.: 567,440

[22] Filed: Dec. 5, 1995

Related U.S. Application Data

[63] Continuation of Ser. No. 209,023, Mar. 10, 1994, abandoned.

[51] Int. Cl.$^6$ .................................................. H04Q 7/32
[52] U.S. Cl. .................. 455/54.1; 455/33.1; 455/56.1; 340/995; 342/457
[58] Field of Search ................ 455/54.1, 56.1, 455/54.2, 33.1; 379/59; 340/961, 995; 342/386, 357, 457, 458

[56] References Cited

U.S. PATENT DOCUMENTS

| | | | |
|---|---|---|---|
| 3,925,750 | 12/1975 | Gilbert et al. | 340/961 |
| 4,023,176 | 5/1977 | Currie et al. | 342/457 |
| 4,596,988 | 6/1986 | Wanka | 342/457 |
| 4,968,629 | 11/1990 | Apsell et al. | 342/457 |
| 5,068,654 | 11/1991 | Musher | 455/54.1 |
| 5,210,534 | 5/1993 | Janey | 340/961 |
| 5,218,716 | 6/1993 | Comroe et al. | 455/54.2 |

Primary Examiner—Edward F. Urban
Attorney, Agent, or Firm—Daniel C. Crilly

[57] ABSTRACT

Geographic relationship between communication units (102, 103) within a communication system (100) can be achieved when a first communication unit transmits its location information. Upon receiving this location information, a second communication unit determines its location information. Having this information, the second communication unit then determines a geographic relationship between the two units and subsequently displays this information both visually and audibly.

12 Claims, 2 Drawing Sheets

METHOD FOR DETERMINING GEOGRAPHIC RELATIONSHIPS BETWEEN COMMUNICATION UNITS

This is a continuation of application Ser. No. 08/209,023, filed Mar. 10, 1994 and now abandoned.

FIELD OF THE INVENTION

This invention relates generally to communication systems and, in particular, to geographic relationships between communication units.

BACKGROUND OF THE INVENTION

Communication systems are known to include a communication resource controller, a plurality of communication units, and communication resources. In such communication systems, the communication units communicate with each other via the communication resources, where a communication resource may be an RF channel, a pair of RF channels, a TDM slot, or any medium for carrying RF signals. To initiate a communication, a communication unit transmits a communication request to the communication resource controller via a communication resource dedicated for control information (control channel). The communication request includes a request for a particular service, such as allocation of a communication resource and identity of a target communication unit, or units. For example, the request may be for a group call which identifies all the communication units in the same group as the initiating communication unit.

Upon receiving this request, the communication resource controller determines whether the communication unit is authorized to access the system and, if so, grants the request. Having granted the request, the communication resource controller allocates a communication resource to the initiating communication unit and the target communication units, and then transmits a communication resource allocation message on the control channel. All communication units within the coverage area of the control channel antenna receives the allocation message. However, only the communication units identified in the message, i.e., the initiating and target communication units, will access the allocated communication resource and subsequently partake in the communication.

While this method allows communication units to communicate with each other, it provides little if any information regarding a geographic relationship between the units. In many systems operated by public safety organizations, geographic relationship between units would be extremely valuable information. For example, if the system is operated by a police district, and a dispatcher has assigned several communication units to respond to a bank robbery, the police officers operating the communication units and the dispatcher would benefit from knowing the geographic relationship between the units. This information would be beneficial in that the police officers will know where the other officers are, how far the others are away from the scene, and in which direction they are headed. By knowing this information, a police officers action may vary. For example, if the officer is the only officer in the immediate vicinity of the bank robbery, that officer will have to knowingly respond without backup and that backup is several minutes away. While this would be a beneficial feature enabling operators to respond to and anticipate future scenarios, especially for public safety users, it is not available in present systems.

Therefore, a need exists for a method that provides geographic relationship information to communication units involved in a communication.

DESCRIPTION OF A PREFERRED EMBODIMENT

Generally, the present invention provides a method that determines geographic relationships between communication units that are involved in a communication. This is accomplished after a communication has been established and a first communication unit transmits its location. Upon receiving this information, a second communication determines whether this information is relevant to that unit. When the information is relevant, the second communication unit determines it location and subsequently determines a geographic relationship between its location and the location of the first communication unit. With such a method, operators of communication units within a communication system are provided with geographic relationship information. This information allows the operators to more efficiently respond to and anticipate multiple future scenarios.

Figure 1:
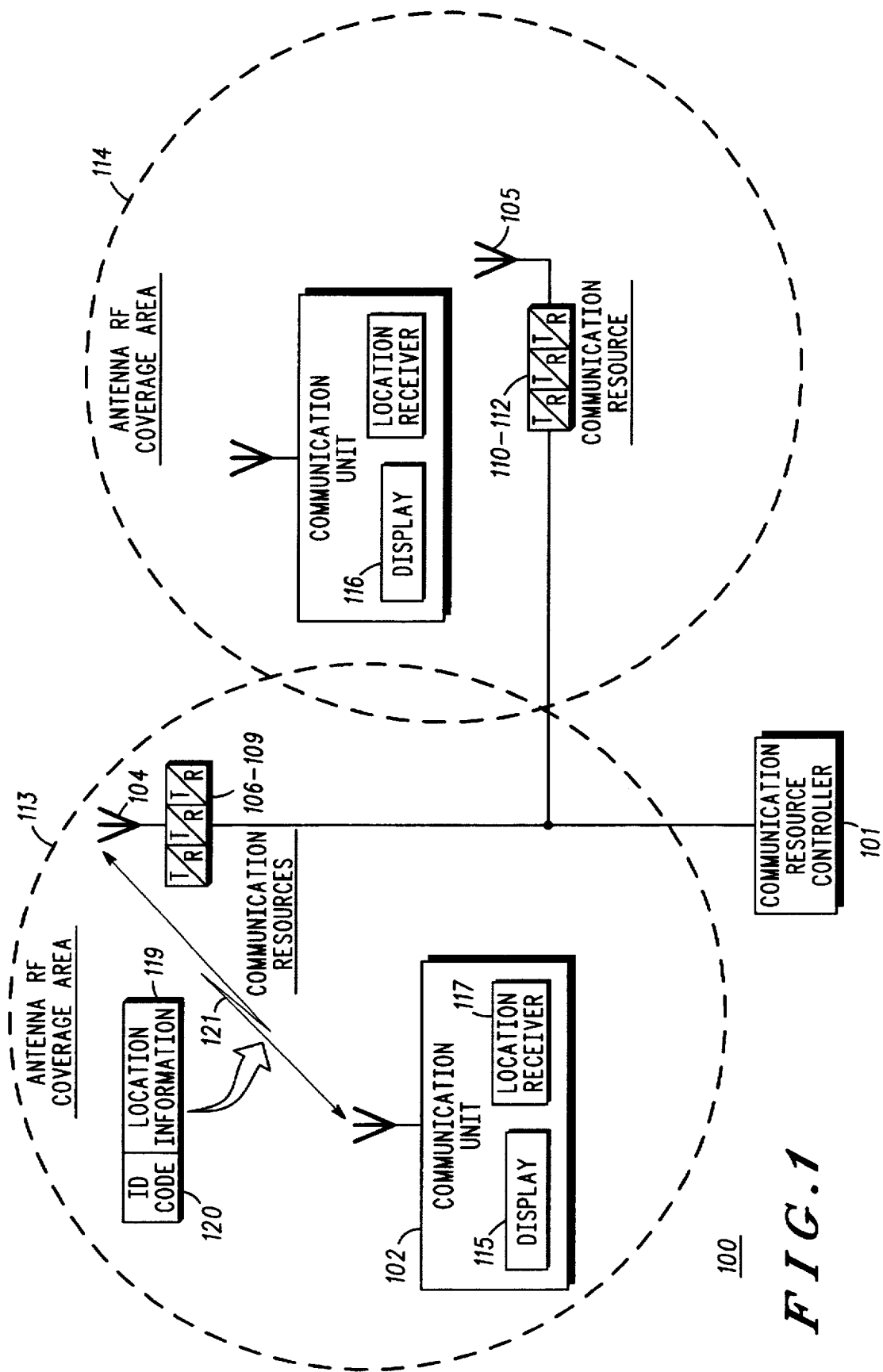
FIG. 1 illustrates a communication system that incorporates the present invention.

The present invention can be more fully described with reference to FIGS. 1 and 2. FIG. 1 illustrates a communication system (100) that includes a communication resource controller (101), a plurality of communication units (102, 103), a plurality of antennas (104, 105), and a limited number of communication resources (106–112). Each of the antennas (104, 105), which may be incorporated into a base station such as a Motorola QUANTAR™ base station, has an RF coverage area (113, 114). Each of the communication units (102, 103) includes a display (115, 116) and a location receiver (117, 118). The display (115, 116) may be an audio display or a visual display. If the display is a visual display it may be an LCD display, a CRT display, or a heads-up display. (The operation of the display will be discussed below). The location receiver (117, 118) may be a global positioning satellite (GPS) receiver that is coupled to a communication processor (not shown).

Within the communication system (100), any of the communication units (102, 103) may initiate a communication by transmitting a request to the communication resource controller (101). The communication resource controller (101), which may be a Motorola trunked central controller, processes the request and, if valid, grants the request. For example, if the request was for a group call, the communication resource controller would transmit a message via the control channel to the communication units indicating the group call. Once the group call was established, a first communication unit (102) would transmit a message (119) which includes its identification code (120) and its location information (121). The identification code (120) may be its unique communication unit code, or the communication group code. Utilization of the message (119), will be discussed below with reference to FIG. 2.

Figure 2:
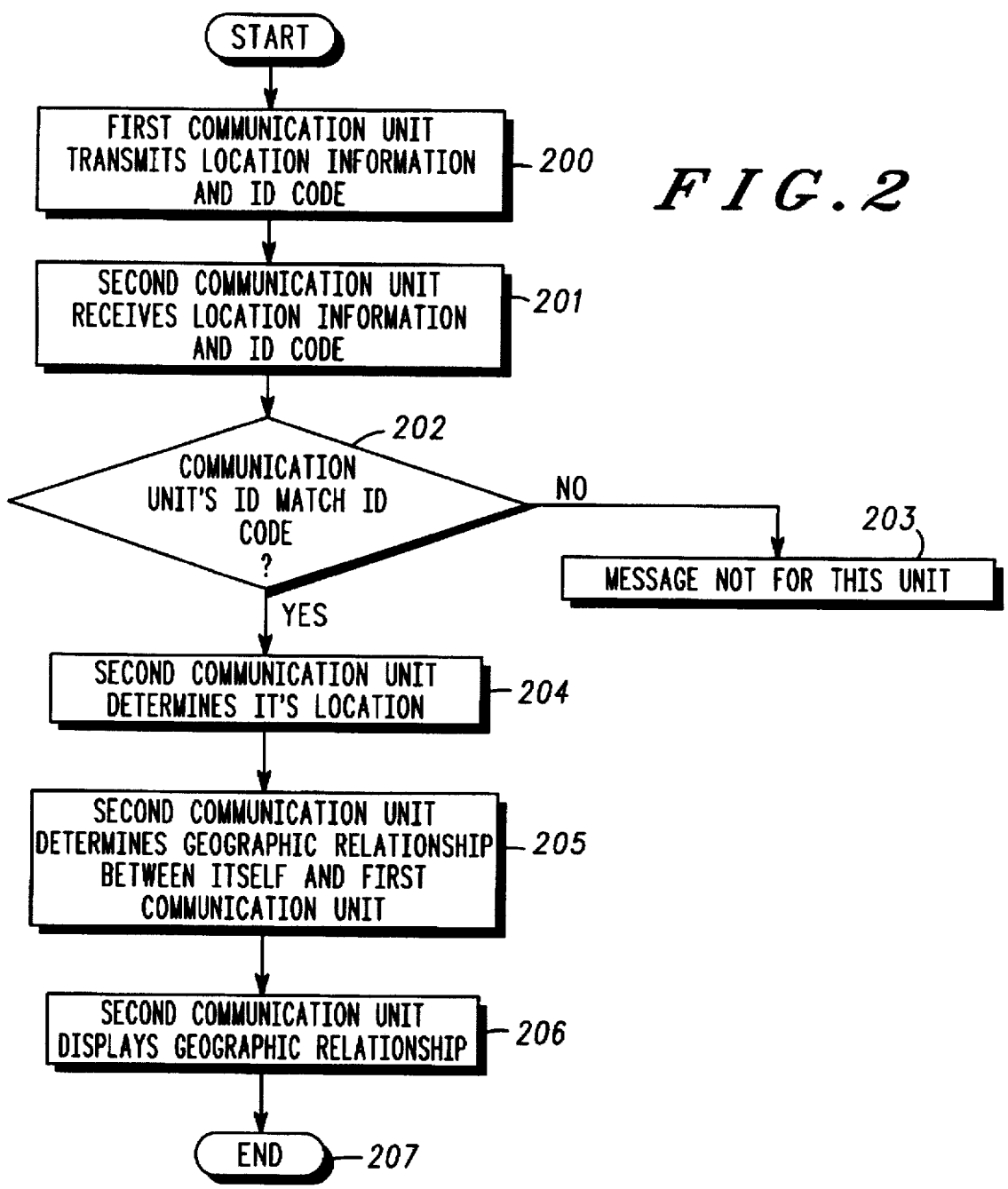
FIG. 2 illustrates a flow diagram that may be used to implement the present invention.

FIG. 2 illustrates a flow diagram that may be incorporated in the communication system 100 to implement the present invention. At step 200, upon establishment of a call, the first communication unit transmits its location information and an identification (ID) code. Location information may include the velocity of the first communication unit, a directional heading, and location coordinates. This information is obtained by the first communication unit via its location receiver. Upon receiving (201) the first communication unit's location and ID code information, a second communication unit determines whether the unit ID of the first communication unit substantially matches the unit ID of the second communication unit 202. A match may occur because the first and second units are in the same talk group, thus, they have the same ID code. Alternatively, a match may occur because the message includes a target ID code (the ID code of the intended recipient of the call) which matches the unique ID code of the second unit. If the unit IDs do not match (202), the message is not intended for the second communication unit (203).

If the unit IDs do match (202), the second communication unit determines (204) its location information which is similar to that of the first communication unit, i.e., velocity, directional heading, and location coordinates. Having the location information of the first and second communication unit, the second communication unit determines a geographic relationship between itself and the first communication unit (205). This determination may be derived as a geographic vector which indicates tendencies of movement, its distance apart, relative speed, relative heading differences, etc. This information is readily calculated by a processor within the communication unit that is programmed to execute these steps. Having obtained the geographic relationship, the second communication unit displays the geographic relationship (206). Once the geographic relationship is displayed, the process ends (207).

The geographic relationship may be displayed either audibly, visually, or a combination of both. For a visual display, the geographic relationship may be displayed as an overlay of a regional map and a vector relationship, as text, or in any other graphical means. In addition to displaying the geographic relationship, the second communication unit may also display the location information of both communication units.

The second communication unit may also display the geographic relationship as audible information in a variety of ways. For example, the second communication unit may include a text-to-speech synthesizer that converts a text representation of the geographic relationship to a speech message. As an alternate example, the second communication unit may include a multi-speaker audio system to render the geographic relationship as a multi-dimensional audio message. To illustrate, assume that the second communication unit is mounted in an automobile having four speakers located in the front left, front right, rear left and rear right positions. Upon receiving a speech message that represents the geographic relationship, the message is time and amplitude phased to provide the perception that the talker is in some two dimensional space with relationship to the driver. This audible perception provides the directional relationship, while the speech message conveys the geographic separation, location, and velocity.

To illustrate the multi-dimensional audio message, assume that the first communication unit is operated by Officer Jones, and the second unit is operated by Officer Smith. Once the a communication has been established, the first unit transmits its location information to the second unit. In addition to this information, Officer Jones transmits a speech message such as "I'm heading down First Street at 70 MPH and should be there in a minute". The second unit receives the speech message and the first unit's location information. The second unit then determines its location and the geographic relationship between the two units. With this information, the second unit time and amplitude phase adjusts the speech message to provide a directional relationship. Thus, if Officer Jones is in front of Officer Smith, the time and amplitude phase adjustment would produce the perception that Officer Jones was standing in front of Officer Smith as the message was spoken.

As a further example of audio displaying the geographic relationship, the computed geographic relationship may be displayed as a series of audible tones. In this instance, the rate of the audible tones could be varied to indicate the rate at which the units are closing on each other or separating from each other. For example, if the units are separating, the rate can decrease, whereas, if the units are closing, the rate can increase. In addition, the pitch of the tones may be varied to indicate relative geographic information. Still further, the audible tones may be a combination of a pitch variant and speed variant to indicate directional information as well as geographic trends, i.e., approaching or retreating.

The present invention provides a method for displaying geographic relationships between communication units involved in a communication. With such a method, communication units responding to a particular task can be provided with information regarding their geographic relationship to other communication units. This feature was not previously available in prior art systems and will benefit the users of communication systems, particularly public safety users.

We claim:

1. A method for determining a geographic relationship between communication units, the method comprising the steps of:

transmitting, by a first communication unit, a speech message together with first location information of the first communication unit to a second communication unit;

receiving, by the second communication unit, the speech message together with the first location information;

determining, by the second communication unit, second location information of the second communication unit;

determining, by the second communication unit, a geographic relationship between the first communication unit and the second communication unit based on the first location information and the second location information; and displaying, by the second communication unit, the geographic relationship and the speech message audibly to a user of the second communication unit by generating a multi-dimensional audible message, wherein the multi-dimensional audible message produces an acoustic perception of at least a directional component of the geographic relationship.

2. The method of claim 1, wherein the step of transmitting further comprises the step of transmitting velocity, directional heading, and location coordinates as at least part of the first location information.

3. The method of claim 1, wherein the step of displaying further comprises the step of displaying the geographic relationship visually to the user of the second communication unit.

4. The method of claim 2, wherein the step of determining second location information further comprises the step of determining velocity, directional heading, and location coordinates as at least part of the second location information.

5. The method of claim 4, wherein the step of displaying further comprises the step of visually displaying the geographic relationship to the user of the second communication unit as a vector, wherein the vector is derived from the velocity, the directional heading, and the location coordinates of the first communication unit and the velocity, the directional heading, and the location coordinates of the second communication unit.

6. A method for a first communication unit to determine a geographic relationship between the first communication unit and a second communication unit, the method comprising the steps of:

receiving first location information and a speech message from the second communication unit;

determining second location information for the first communication unit;

determining a geographic relationship between the first communication unit and the second communication unit based on the first location information and the second location information; and displaying the geographic relationship and the speech message audibly to a user of the first communication unit by generating a multi-dimensional audible message, wherein the multi-dimensional audible message produces an acoustic perception of at least a directional component of the geographic relationship.

7. The method of claim 6, wherein the step of receiving further comprises the step of receiving velocity, directional heading, and location coordinates as at least part of the first location information.

8. The method of claim 7, wherein the step of determining second location information further comprises the step of determining velocity, directional heading, and location coordinates as at least part of the second location information.

9. The method of claim 8, wherein the step of displaying further comprises the step of visually displaying the geographic relationship to the user of the first communication unit as a vector, wherein the vector is derived from the velocity, the directional heading, and the location coordinates of the first communication unit and the velocity, the directional heading, and the location coordinates of the second communication unit.

10. A method for a dispatch station to determine a geographic relationship between a communication unit and the dispatch station, the method comprising the steps of:

receiving first location information and a speech message from the communication unit;

ascertaining second location information of the dispatch station;

determining a geographic relationship between the dispatch station and the communication unit based on the first location information and the second location information; and audibly displaying the geographic relationship and the speech message simultaneously to a user of the dispatch station by generating a multi-dimensional audible message, wherein the multi-dimensional audible message produces an acoustic perception of at least a directional component of the geographic relationship.

11. The method of claim 10, wherein the step of receiving further comprises the step of receiving velocity, directional heading, and location coordinates as at least part of the first location information.

12. The method of claim 11, wherein the step of displaying further comprises the step of visually displaying the geographic relationship to the user of the dispatch station as a vector, wherein the vector is derived from the second location information and the velocity, the directional heading, and the location coordinates of the communication unit.

* * * * *